(12) United States Patent (10) Patent No.: US 8,264,518 B2
Khouri et al. (45) Date of Patent: Sep. 11, 2012

(54) GESTURE-BASED ACTIONS IN A VIDEO COMMUNICATION SESSION

(75) Inventors: Joseph F. Khouri, San Jose, CA (US); Mukul Jain, San Jose, CA (US); Raghurama Bhat, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 430 days.

(21) Appl. No.: 12/568,479

(22) Filed: Sep. 28, 2009

(65) Prior Publication Data

US 2011/0074911 A1 Mar. 31, 2011

(51) Int. Cl.
*H04N 7/14* (2006.01)
(52) U.S. Cl. ................ 348/14.08; 348/14.01; 348/14.12
(58) Field of Classification Search .... 348/14.01–14.16; 379/93.18, 354, 202.01, 212.01; 715/863; 455/417
See application file for complete search history.

(56) References Cited

U.S. PATENT DOCUMENTS

| 5,644,628 A * | 7/1997 | Schwarzer et al. ........ 379/93.19 |
| 2006/0239253 A1* | 10/2006 | Gallant et al. ................ 370/352 |
| 2007/0188598 A1* | 8/2007 | Kenoyer .................... 348/14.08 |
| 2009/0023430 A1* | 1/2009 | Levien et al. ................. 455/417 |
| 2010/0245536 A1* | 9/2010 | Huitema et al. ........... 348/14.08 |

* cited by examiner

*Primary Examiner* — Melur Ramakrishnaiah
(74) *Attorney, Agent, or Firm* — Baker Botts L.L.P.

(57) ABSTRACT

In one embodiment, a method for transferring a communication session detects a transfer indication generated by a user of a first video conference system, where the transfer indication requests to transfer an active voice communication session. The method acquires image information associated with the transfer indication, where the image information includes at least one frame captured from a second video conference system having an active video conference session with the first video conference system. The method identifies a mobile communication device associated with the transfer indication and having the active voice communication session and identifies a target communication device using the image information associated with the transfer indication. The method also initiates transfer of the voice communication session to the target communication device.

18 Claims, 4 Drawing Sheets

GESTURE-BASED ACTIONS IN A VIDEO COMMUNICATION SESSION

TECHNICAL FIELD

This disclosure relates generally to gesture-based actions in a video communication session

BACKGROUND

Video conferencing systems are increasingly used for communications between remote users. At the same time, these users often have many additional communication devices, such as mobile phones.

DESCRIPTION OF EXAMPLE EMBODIMENTS

Overview

In one embodiment, a method for transferring a communication session detects a transfer indication generated by a user of a first video conference system, where the transfer indication requests to transfer an active voice communication session. The method acquires image information associated with the transfer indication, where the image information includes at least one frame captured from a second video conference system having an active video conference session with the first video conference system. The method identifies a mobile communication device associated with the transfer indication and having the active voice communication session and identifies a target communication device using the image information associated with the transfer indication. The method also initiates transfer of the voice communication session to the target communication device.

DESCRIPTION

Figure 1:
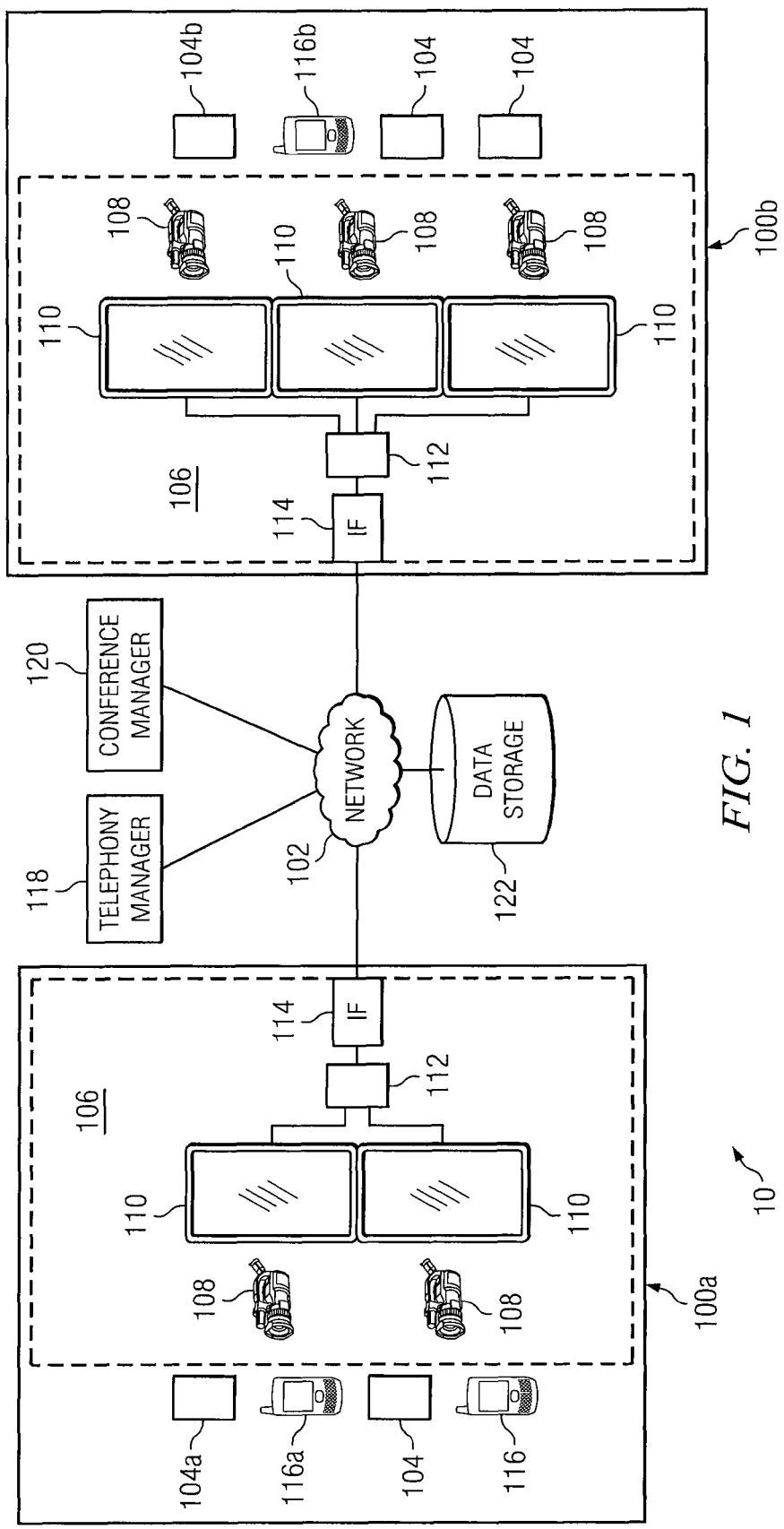
FIG. 1 illustrates an example system for conducting a visual conference and for taking action on a communication session using captured image information.

FIG. 1 is a block diagram illustrating a system 10 for conducting a visual conference between locations and for taking actions on communication sessions using captured image information. For example, system 10 supports transferring of active calls between mobile phones in response to gesture-based indications. The illustrated embodiment includes a network 102 that facilitates communications between remotely located sites 100 using conference equipment 106. Sites 100 include any suitable number of users 104 that participate in the visual conference. Using conference equipment 106, system 10 can facilitate the detection of transfer indications, such as predetermined gestures, and the transfer or other treatment of calls or other communication sessions based on the transfer indications.

Network 102 represents communication equipment, including hardware and any appropriate controlling logic, for interconnecting elements coupled to network 102 and facilitating communication between sites 100. Network 102 may include a local area network (LAN), a metropolitan area network (MAN), a wide area network (WAN), any other public or private network, a local, regional, or global communication network, an enterprise intranet, other suitable wireline or wireless communication link, or any combination of the preceding. Network 102 may include any combination of gateways, routers, hubs, switches, access points, base stations, and any other hardware, software, or a combination of the preceding that may implement any suitable protocol or communication.

User 104 represents one or more individuals or groups of individuals who are present for the visual conference. Users 104 participate in the visual conference using any suitable device and/or component, such as an audio Internet Protocol (IP) phones, video phone appliances, personal computer (PC) based video phones, and streaming clients. During the visual conference, users 104 can engage in the video conference session as speakers or non-speakers.

Conference equipment 106 facilitates video conferencing among users 104. Conference equipment 106 includes any suitable elements to establish and facilitate video conferences. For example, conference equipment 106 may include loudspeakers, microphones, and speakerphones. In the illustrated embodiment, conference equipment 106 includes cameras 108, monitors 110, a processor 112, and a network interface 114.

Cameras 108 include any suitable hardware and/or software to facilitate capturing images of users 104 and their surroundings. Cameras 108 capture and transmit images of users 104 using any appropriate video signals (e.g., a high definition video signal). Monitors 110 include any suitable hardware and/or software to facilitate receiving input and displaying images to users 104. For example, monitors 110 may include a notebook PC, a wall mounted display, a floor mounted display, or a free standing display. Monitors 110 display images (such as images of selected users 104) using any suitable technology to provide realistic images, such as high definition, compression hardware, and efficient encoding/decoding standards. Conference equipment 106 establishes visual conference sessions using any suitable technology and/or protocol, such as Session Initiation Protocol (SIP) or H.323. Additionally, conference equipment 106 may support and be interoperable with other video systems supporting other standards, such as H.261, H.263, and/or H.264.

Processor 112 controls the operation and administration of conference equipment 106 by processing information and signals received from cameras 108 and interfaces 114. Processor 112 includes any suitable hardware, software, or both that operate to control and process signals. For example, processor 112 may be a programmable logic device, a microcontroller, a microprocessor, any suitable processing device, or any combination of the preceding. Interface 114 communicates information and signals to and receives information and signals from network 102. Interface 114 represents any port or connection, real or virtual, including any suitable hardware and/or software that allows conference equipment 106 to exchange information and signals with network 102, other conference equipment 106, or and/or other elements of system 10.

As illustrated, each site 100 also includes one or more mobile communication devices 116. Mobile communication devices 116 represent any suitable portable hardware, including appropriate controlling software and logic, capable of establish communication sessions with remote devices. For example, mobile communication devices 116 may include, but are not necessarily limited to, mobile phones, personal digital assistants (PDAs), wireless handsets, notebook computer systems, and tablet computer systems.

System 10 also includes telephony manager 118, conference manager 120, and data storage 122. Telephony manager 118 represents hardware and appropriate controlling logic and/or software for managing voice communication sessions. For example, telephony manager 118 may facilitate signaling and setup for calls associated with mobile communication devices 116. Conference manager 120 represents hardware and appropriate controlling logic and/or software for managing conference communication sessions. For example, conference manager 120 may facilitate signaling and setup for video communication sessions between sites 100. According to particular embodiments, conference manager 120 includes a communications interface for interfacing with other network elements, and a controller for controlling the operation of conference manager 120 (for example, by executing computer or other electronic instructions embodied in physical media). While the illustrated embodiment includes a separate telephony manager 118 and conference manager 120, system 10 contemplates the functions of these elements being combined or separated as appropriate. For example, the functions of these two elements may be provided by a single management element, or the functions of these elements may be distributed among any number of other system elements.

Data storage 122 represents hardware and appropriate controlling logic and/or software for maintaining information. For convenience sake, system 10 is illustrated as including a single data storage element accessible through network 102. However, it should be understood that data storage can be combined or distributed throughout system 10 as appropriate. In certain embodiments, data storage 122 maintains information to facilitate management of communications session, including voice and video communication sessions, and information regarding users 104. For example, data storage 122 may include an enterprise database that maintains information regarding employees of an organization, including contact information, biometric information (such as a photograph), associated mobile communication devices, and other suitable information. As another example, data storage 122 may include a conference database that helps to track scheduled and/or ongoing conference calls, such as information regarding users 104 scheduled to participate in conference calls. As another example, data storage 122 may include a call control database that maintains information regarding mobile communication devices 116, ongoing communication sessions involving mobile communication devices 116, and other suitable call control information.

During video communication sessions, elements of system 10 interoperate to enable users 104 to affect ongoing communication sessions using transfer indications, such as gestures. In particular embodiments, users 104 may use transfer indications to affect communication sessions involving mobile communication devices 116. Results can include, for example, transferring communication sessions and conferencing in new participants. Transfer indications include any suitable combination of physical and logical system actions that, either alone or in combination, indicate a desired operation. According to particular embodiments, transfer indications include gestures, user interface inputs (such as key presses), spoken commands, and/or any other appropriate action for indicating a desired operation. For example, a transfer indication may be a predetermined gesture, such as a mock "throw" from one user 104 to another user 104 participating in a video conference. Additional visual cues may be included, such as eye gaze, posture, and direction of view.

During an ongoing video conference session between conference equipment 106 at two or more sites 100, conference equipment 106 at one site 100 may detect a transfer indication. For example, processor 112 may detect a predetermined gesture of one of users 104 captured by cameras 108. In response, processor 112 may inform conference manager 120 of the transfer indication. In addition, processor 112 may capture and/or maintain image information associated with the transfer indication. For example, processor 112 may maintain one or more captured frames from cameras 108 for further analysis in identifying a source and destination of the transfer request.

In response to receiving an indication of the transfer request, conference manager 120 initiates steps to appropriately respond to the request, including steps to identify a source and destination of the transfer request and an appropriate action. Conference manager 120 may request information from conference equipment 106 at participating sites to help in identifying a source and destination of the transfer request. For example, conference manager 120 may collect image information from both the originating site 100 and potential destination sites 100. In addition, conference manager may access one or more databases and communicate with telephony manager 118 to help in determining an appropriate source, destination and action.

To identify the source mobile communication device 116, conference manager 120 can use information such as expected conference participants, captured image information, and data regarding ongoing communications sessions involving mobile communication devices 116. For example, conference manager 120 may access information regarding participants scheduled for participation at the originating site 100 in the video conference. Alternatively or in addition, conference manager 120 may access other information (such as access code entries or data regarding locations of identification cards) to determine users 104 at the originating site 100. Using captured image information from that site 100, conference manager 120 can also use facial recognition or image comparison algorithms to determine the identities of users 104. For example, conference manager 120 may compare captured image information with photographs of expected participants maintained in an enterprise database. After identifying users 104 at the originating site, conference manager 120 could then determine mobile communication devices 116 associated with those users 104 in the enterprise database.

Conference manager 120 can further interface with telephony manager 118 and/or data storage 122 to attempt to determine whether there are active communication sessions for mobile communication devices 116 at the originating site 100. Alternatively, or in addition, user 104 associated with the source mobile communication device 116 may provide input to the source mobile communication device 116 to help in the identification. For example, user 104 may press a "throw" button in conjunction with a predetermined gesture. According to particular embodiments, sites 100 may further include equipment for detecting the presence of mobile communication devices 116 and for detecting active communication sessions involving those devices. For example, if mobile communication devices 116 were 802.11 compliant handsets, access points within site 100 could detect the presence and identify those devices 116.

In addition to identifying the source mobile communication device 116, conference manager 120 may determine the appropriate action requested. For example, the transfer indication may request transfer, conference of another user, or other suitable action, depending on the specific gesture made by user 104.

In addition to identifying the source mobile communication device 116 and the desired action, conference manager 120 determines an indicated target of the action. For example, for a transfer, conference manager 120 may attempt to determine a target mobile communication device 116. To identify a target, conference manager 120 uses techniques similar to those described above for identifying a source. For example, conference manager 120 can use information such as expected conference participants, captured image information, and data regarding ongoing communications sessions involving mobile communication devices 116. As an additional example for identifying a target, conference manager 120 may use captured image information from one or more sites 100 to analyze information such as the direction of a transfer indication (e.g., what direction was the "throw"), eye gaze of participants (e.g., who was the transfer originator looking towards), and arrangement of participating users 104 at each site 100.

After identifying the intended target, conference manager 120 initiates the requested action. For example, conference manager 120 may communicate with telephony manager 118 to effect a transfer of a voice and/or video communication session from one mobile communication device 116 to another.

As a particular example, consider a case in which user 104a (associated with mobile communication device 116a) makes a gesture requesting transfer of an active voice communication session to user 104b at site 100b. Processor 112 at site 100a may report the gesture, captured image information, and other data regarding the ongoing session to conference manager 120. Conference manager 120 then accesses data, communicates with other elements, and processes information to attempt to identify the source mobile communication device 104a and the intended destination user 104 (user 104b) and, by extension, the intended mobile communication device 116 (116b in this example). Conference manager 120 then initiates the requested transfer.

To prevent unintended or erroneous transfers, conference manager 120 and/or telephony manager 118 may introduce appropriate checking steps. For example, prior to performing any action on a communication session, telephony manager 118 may query the source device 116 and/or the target device 116 for confirmation of the action.

While the previous example was provided in the context of transfer of a voice call from one device 116 to another, system 10 contemplates using these and similar techniques to perform actions on any suitable communication sessions. This includes, for example, "throwing" texts, emails, chat sessions, voice calls, and any other suitable communications. In addition, the requested action need not be a transfer, but could be any other suitable action, such as forwarding an email, conferencing in another device to a session, transferring some or all portions of a video conference to a mobile communication device 116, conferencing a communication session into an ongoing video conference, or other suitable action.

Also, while system 10 illustrates a particular embodiment having specific elements arranged in a particular fashion, it should be understood that the present disclosure contemplates modifications, additions, or omissions as appropriate. For example, system 10 may include any suitable number of sites 100 and may facilitate a visual conference between any suitable number of sites 100. As another example, sites 100 may include any suitable number of cameras 108 and monitors 110 to facilitate a visual conference. As yet another example, the visual conference between sites 100 may be point-to-point conferences or multipoint conferences. Moreover, the operations of system 10 may be performed by more, fewer, or other components. Additionally, operations of system 10 may be performed using any suitable logic, such as computer executable software, potentially maintained in one or more computer-readable media.

Figure 2:
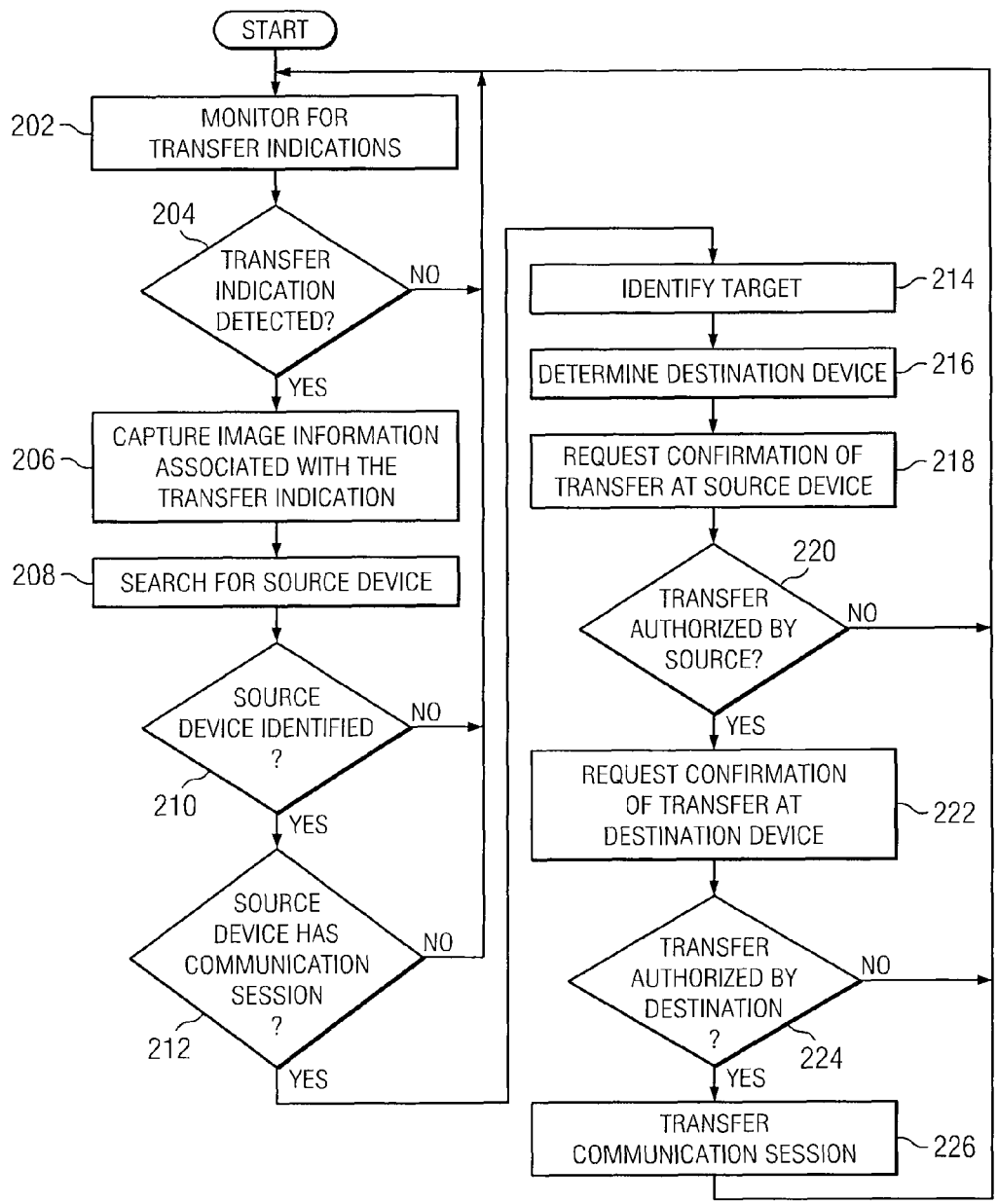
FIG. 2 illustrates an example method for taking action on a communication session using captured image information.

FIG. 2 is a flowchart illustrating an example method for taking an action on a communication session using captured image information. The system monitors for transfer indications at step 202. For example, conference manager 120 may monitor for transfer indications, such as requests for transfers or conferences, detected by processors 112 at sites 100. The system determines whether a transfer indication has been detected at step 204. If so, the system captures image information associated with the transfer indication at step 206. For example, in response to receiving a transfer indication, conference manager 120 may direct each site 100 participating in an active conference to collection one or more frames using cameras 108.

The system searches for an identification of a source mobile communication device 16 associated with the transfer indication at step 108. For example, as previously discussed, conference manager 120 may analyze image information signals from other elements within system 10, and other suitable information in an attempt to identify a particular user associated with the perceived transfer indication at an originating site 100. Based on the identity of that user, conference manager 120 may identify a source mobile communication device 16. Upon successfully identifying the source mobile communication device at step 210, the system determines whether that source device has an active communication session at step 212. For example, conference manager 120 may interact with telephony manager 118 to determine whether the identified mobile communication device 116 has an active voice communication session. As another example, conference manager 120 may interact directly with mobile communication device 116 to determine whether there are other types of communication sessions or communications appropriate for taking an indicated action upon.

If so, the system identifies a target communication device at step 214. For example, conference manager 120 may used captured image information, information from other elements within system 10, and other appropriate data to identify an intended target of the transfer indication. As a particular example, consider an active video communication session taking place between site 100a and site 100b, and user 104a making a gesture indicating a desire to transfer an active voice communication session to user 104b at site 100b. Conference manager 120 may access captured image information and perform facial recognition or other video analysis to determine the identity of user 104b at site 100b. Upon determining an identified target, the system determines a destination device at step 216. For example, based on the identity of user 104b, conference manager 120 may access an enterprise database to determine mobile devices 116 associated with user 104b.

After identifying the source and intended target of an action for performing on a communication session, the system may seek authorization from one or both of the participants in that action. As illustrated, the system seeks and checks authorization from the source and destination devices at steps 218, 220, 222, and 224 prior to performing the intended action. Upon receiving confirmation, the system performs the requested action on the communication session. As illustrated, this involves the transfer of a communication session from the source device to the target device. However, as discussed above, the system described may provide for performing any suitable action on communication sessions and is not limited to transfers of voice communication sessions.

Although the present disclosure describes and illustrates particular steps of the method of FIG. 2 as occurring in a particular order, the present disclosure contemplates any suitable steps of the method as occurring in any suitable order. Moreover, although the present disclosure describes and illustrates particular apparatus or systems carrying out particular steps of the method of FIG. 2, the present disclosure contemplates any suitable apparatus or systems carrying out any suitable steps to accomplish the techniques described with respect to this method.

Figure 3:
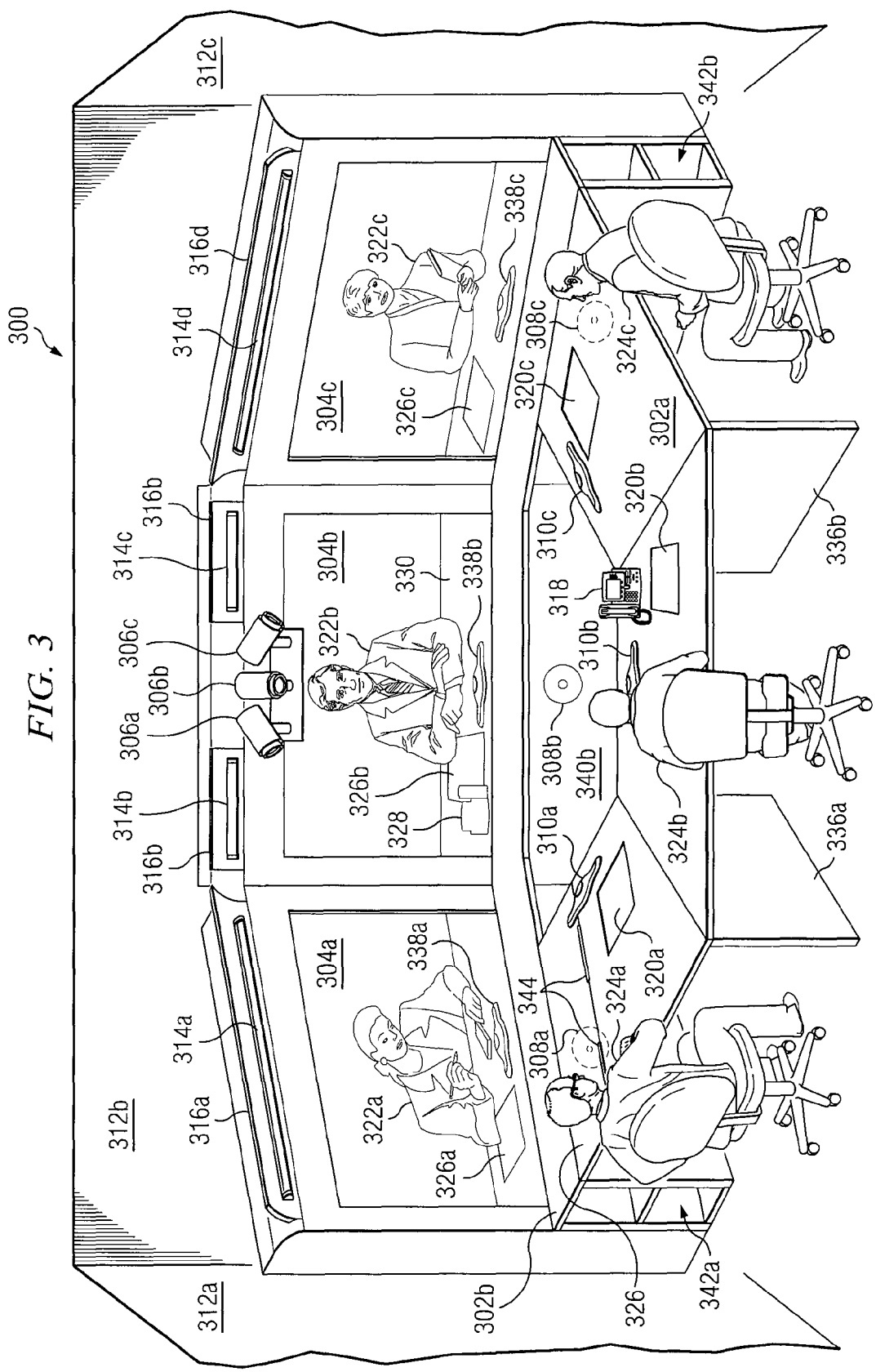
FIG. 3 illustrates a perspective view of an exemplary conference system for supporting actions on communication sessions using captured image information.

FIG. 3 illustrates a perspective view of a local exemplary conference system including portions of a remote conference system as viewed through local displays. Conference system 300 may be similar to any one of sites 100 of FIG. 1. Conference system 300 provides for a high-quality visual conferencing experience that surpasses typical video conference systems. Through conference system 300 users may experience lifelike, fully proportional (or nearly fully proportional) images in a high definition (HD) virtual table environment. The HD virtual table environment, created by conference system 300, may help to develop an in-person feel to a visual conference. The in-person feel may be developed not only by near life-sized proportional images, but also by the exceptional eye contact, gaze perspective (hereinafter, "eye gaze"), and location specific sound. The eye gaze may be achieved through the positioning and aligning of the users, the cameras and the monitors. The location specific sound may be realized through the use of individual microphones located in particular areas that are each associated with one or more loudspeakers located in proximity to the monitor displaying the area in which the microphone is located. This may allow discrete voice reproduction for each user or group of users. Having sophisticated conference equipment at conference system 300 permits elements to detect transfer indications, collect and analyze information regarding an ongoing conference, and determine source, destination, and indicated action associated with a transfer indication.

As illustrated, conference system 300 includes a table 302, monitors 304, cameras 306, loudspeakers 308, and microphones 310. In addition conference system 300, as illustrated, may include many other aspects, features, components and/or devices within the room, including such components as walls 312, and lighting (e.g., 314 and 316). These components may be designed to help in detecting transfer indications and appropriately identifying source and destination points related to the indications.

As illustrated, conference system 300 is providing conference services involving local users 324a-324c and remote users 322a-322c. Because of the particular arrangement contemplated, conference system 300 may help facilitate natural eye gaze and location specific sound features, which help to produce a very natural dialogue between local and remote users. When, for example, remote user 322a speaks, his voice is reproduced through loudspeaker 308a located proximate to monitor 304a, the monitor on which remote user 322a is displayed. Local users 324 may naturally turn their attention towards the sound and thus may be able to quickly focus their attention on remote user 322a. Furthermore, if remote user 322a is looking at something or someone, the exceptional eye gaze capabilities of conference system 300 may allow local users 324 to easily identify where he is looking. For example, if remote user 322a asks "what do you think" while looking at local user 324c, the eye gaze ability of conference system 300 may allow all the users, both local and remote, to quickly identify who "you" is because it may be clear that remote user 322a is looking at local user 324c. This arrangement thus helps to facilitate the identification of source and target users associated with a transfer indication.

By facilitating a video conference in which participants have the feeling of being in the same room, the system can support accurate detection of transfer indications and of source and target for those indications. An in-person-like experience for a video conference may be achieved by the fact that the conference system can include many of the features and/or components of a room. In some embodiments the rooms at both ends of the conference may be similar, if not identical, in appearance because of the use of conference system 300. Thus, when local users 324 look into monitors 304 they are presented with an image having, in the background, a room that appears to match their own room. Another aspect of conference system 300 that lends itself to creating an in-person experience is the configuration of table 302, remote table 330, monitors 304 and remote cameras 306. These components are positioned in concert with one another such that it appears that table 302 continues through monitor 304 and into table 330, forming a single continuous table, instead of two separate tables at two separate locations.

Besides the placement of remote table 330, the placement and alignment of remote cameras 306 may be such that the correct portion of table 330 is within remote cameras 306 field of vision as well as the user or group of users that may be sitting at that portion of table 330. More specifically, remote camera 306a may be aligned to capture the outer left portion of table 330 and remote user 322a, remote camera 306b may be aligned to capture the outer center portion of table 330 and remote user 322b and remote camera 306c may be aligned to capture the outer right portion of table 330 and user remote 322c. Each camera 306 and remote camera 306 may be capable of capturing video in high-definition, for example cameras 306 may capture video at 720i, 720p, 1080i, 1080p or other higher resolutions. It should be noted that where multiple users are within a camera's field of vision the alignment of the camera does not need to be changed. This placement of cameras and positioning of users can also help with detecting transfer indications and determining sources and intended targets of those indications.

In some embodiments monitors 304 may be capable of displaying the high-definition video captured by remote cameras 306. For example, monitors 304 may be capable of displaying video at 720i, 720p, 1080i, 1080p or any other high resolution. In some embodiments monitors 304 may be flat panel displays such as LCD monitors or plasma monitors. In particular embodiments monitors 304 may have 60 or 65 inch screens (measured diagonally across the screen). The large screen size may allow conference system 300 to display remote users 322 as proportional and life-sized (or near proportional and near life-sized) images. The high-definition display capabilities and large screen size of monitors 304 may further add to the in-person effect created by conference system 300 by increasing the size of the video image while also maintaining a clear picture (avoids pixelation or blurring that may result from attempting to display a standard definition image on a large monitor).

In some embodiments, monitors 304, remote monitors 304 and remote cameras 306 may further be positioned/aligned to increase the accuracy and efficacy of the eye gaze of remote users 322. Remote cameras 306 may be positioned a predetermined distance below the top edge of remote monitors 304. The predetermined distance may be based on such factors as the size of remote monitors 304 and/or the distance between remote users 322 and remote cameras 306. For example, in particular embodiments, remote cameras 306 may be located 4 to 6 inches below the top of remote monitor 304a. Furthermore, remote cameras 306 may be directed at remote table 330 such that the central axis of each camera may be approximately perpendicular to the outside edge (the edge where the remote users may sit) of remote table 330 (note that where the outside edge is curved the central axis of each camera may be approximately perpendicular to a line tangential to the outside edge of the remote table at a point approximately in the middle of the respective user section). Thus, when remote users 322 are involved in a conference session with local users 324 it may appear that remote users 322 are looking at local users 324. More specifically, the images of remote users 322 may appear on monitor 304 to be creating/establishing eye-contact with local users 324 even though remote users 322 are in a separate location. As may be apparent, increasing the accuracy of the eye gaze increases the in-person feel of a visual conference hosted via conference system 300. In turn, this enables the system to more accurately detect transfer indications as well as the source and destination for those indications.

Another feature of table 302 that may be used to draw users 324 to a particular area and identify those users 324 may be microphone 310. In particular embodiments, microphones 310 may be integrated into table 302, thereby reducing a user's ability to move it. For example, microphone 310 may be centered within the field of vision of the respective camera 306. This may provide an additional cue to the users to draw them to the center of the field of vision. In some embodiments microphones 310 may be directional microphones having cardioid, hypercardioid, or other higher order directional patterns.

Some embodiments may take advantage of being able to have sound coming from a single source (e.g., microphone 310a) having a known location (e.g., the left side of table 302) by enabling location specific sound. Conference system 300 may reproduce the sound detected by a particular microphone with a known location through a loudspeaker, or pair of loudspeakers, in proximity to the monitor that is displaying the area around the particular microphone that detected the sound. Thus, sound originating on the left side of remote conference system 300 may be reproduced on the left side of conference system 300. This may further enhance the in-person effect by reproducing the words of a remote user at the loudspeaker near the monitor on which that remote user is displayed.

As may be ascertained from the preceding description, each remote user 322 may have associated with them a monitor, a remote camera, a remote microphone, and/or a loudspeaker. For example remote user 322c may have associated with him monitor 304c, remote camera 306c, remote microphone 338c, and/or loudspeaker 308c. More specifically, remote camera 306c may be trained on the user section in which user 322c is seated so that his image is displayed on monitor 304c and when he speaks microphone 338c may detect his words which are then played back via loudspeaker 308c while users 324 watch and listen to remote user 322c. Thus, from the perspective of local users 324 the conference system 300 assisted visual conference may be conducted as though remote user 322c was in the room with local users 324. This also helps the system to more accurately detect transfer indications as well as the source and destination for those indications.

It will be recognized by those of ordinary skill in the art that the conference system depicted in FIG. 3, conference system 300, is merely one example embodiment of a conference system. The components depicted in FIG. 3 and described above may be replaced, modified or substituted as appropriate.

Particular embodiments may be implemented as hardware, software, or a combination of hardware and software. As an example and not by way of limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
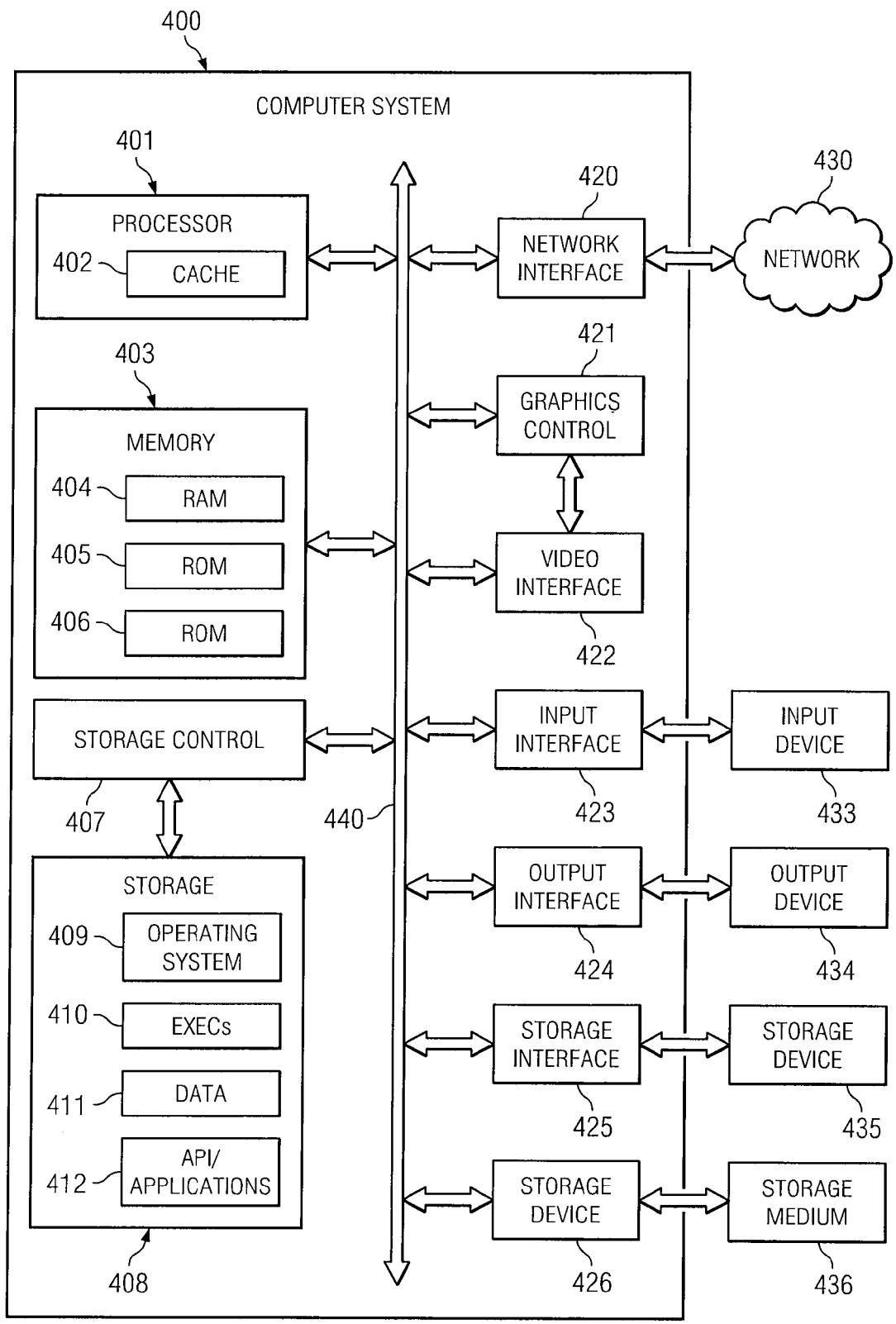
FIG. 4 illustrates an example computer system.

For example, FIG. 4 illustrates an example computer system 400 suitable for implementing one or more portions of particular embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, or one or more super computers.

Computer system 400 may have one or more input devices 433 (which may include a keypad, keyboard, mouse, stylus, etc.), one or more output devices 434 (which may include one or more displays, one or more speakers, etc.), one or more storage devices 435, and one or more storage media 436. An input device 433 may be external or internal to computer system 400. An output device 434 may be external or internal to computer system 400. A storage device 435 may be external or internal to computer system 400. A storage medium 436 may be external or internal to computer system 400.

System bus 440 couples subsystems of computer system 400 to each other. Herein, reference to a bus encompasses one or more digital signal lines serving a common function. The present disclosure contemplates any suitable system bus 440 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 401 (or central processing units (CPUs)). A processor 401 may contain a cache memory unit 402 for temporary local storage of instructions, data, or computer addresses. Processors 401 are coupled to one or more storage devices, including memory 403. Memory 403 may include random access memory (RAM) 404 and read-only memory (ROM) 405. Data and instructions may transfer bidirectionally between processors 401 and RAM 404. Data and instructions may transfer unidirectionally to processors 401 from ROM 405. RAM 404 and ROM 405 may include any suitable computer-readable storage media.

Computer system 400 includes fixed storage 408 coupled bi-directionally to processors 401. Fixed storage 408 may be coupled to processors 401 via storage control unit 407. Fixed storage 408 may provide additional data storage capacity and may include any suitable computer-readable storage media. Fixed storage 408 may store an operating system (OS) 409, one or more executables (EXECs) 410, one or more applications or programs 412, data 411 and the like. Fixed storage 408 is typically a secondary storage medium (such as a hard disk) that is slower than primary storage. In appropriate cases, the information stored by fixed storage 408 may be incorporated as virtual memory into memory 403.

Processors 401 may be coupled to a variety of interfaces, such as, for example, graphics control 421, video interface 422, input interface 423, output interface, and storage interface 425, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 420 may couple processors 401 to another computer system or to network 430. With network interface 420, processors 401 may receive or send information from or to network 430 in the course of performing steps of particular embodiments. Particular embodiments may execute solely on processors 401. Particular embodiments may execute on processors 401 and on one or more remote processors operating together.

In a network environment, where computer system 400 is connected to network 430, computer system 400 may communicate with other devices connected to network 430. Computer system 400 may communicate with network 430 via network interface 420. For example, computer system 400 may receive information (such as a request or a response from another device) from network 430 in the form of one or more incoming packets at network interface 420 and memory 403 may store the incoming packets for subsequent processing. Computer system 400 may send information (such as a request or a response to another device) to network 430 in the form of one or more outgoing packets from network interface 420, which memory 403 may store prior to being sent. Processors 401 may access an incoming or outgoing packet in memory 403 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 403 may include one or more computer-readable storage media embodying software and computer system 400 may provide particular functionality described or illustrated herein as a result of processors 401 executing the software. Memory 403 may store and processors 401 may execute the software. Memory 403 may read the software from the computer-readable storage media in mass storage device 403 embodying the software or from one or more other sources via network interface 420. When executing the software, processors 401 may perform one or more steps of one or more processes described or illustrated herein, which may include defining one or more data structures for storage in memory 403 and modifying one or more of the data structures as directed by one or more portions the software, according to particular needs. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A system comprising:
   a first video conference system;
   a second video conference system;
   a conference manager capable of detecting a transfer indication generated by a first user of the first video conference system and, in response to the transfer indication, acquiring image information associated with the transfer indication, the image information comprising at least one frame captured from the second video conference system in conjunction with an active video conference session between the first video conference system and the second video conference system, identifying a mobile communication device associated with the transfer indication and having an active voice communication session, identifying a target communication device using the image information associated with the transfer indication, and initiating transfer of the voice communication session to the target communication device, and
   wherein the transfer indication comprises a predetermined gesture and wherein the conference manager is further capable of identifying a target communication device using the image information by determining an indicated direction of the predetermined gesture, identifying an image of a second user of the second video conference system based on the indicated direction, analyzing the image of the second user to determine an identity of the second user, and determining a second mobile communication device associated with the identity of the second user to be the target communication device.

2. The system of claim 1, further comprising:
   an enterprise database comprising a plurality of personnel records, each personnel record having an image, a personnel identifier, and an associated mobile communication device; and
   wherein the conference manager is further capable of analyzing the image of the second user to determine an identity of the second user by accessing the enterprise database to attempt to match portions of the image information with images in the enterprise database.

3. The system of claim 2, wherein the conference manager is further capable of accessing a list of participants scheduled for an ongoing conference between the first video conference system and the second video conference system and accessing images from the personnel records for the participants.

4. The system of claim 1, further comprising:
   a telephony manager capable of handling signaling for the active voice communication session; and
   wherein the conference manager is further capable of interfacing with the telephony manager to initiate transfer of the voice communication session to the target communication device.

5. The system of claim 1, wherein the conference manager is further capable of requesting authorization from the mobile communication device for the transfer and, prior to initiating transfer, receiving the authorization from the mobile communication device.

6. The system of claim 1, wherein the image information comprises at least one frame captured from the first video conference system and at least one frame captured from the second video conference system.

7. A method comprising:
   detecting a transfer indication generated by a first user of a first video conference system indicating a request to transfer an active voice communication session;
   acquiring image information associated with the transfer indication, the image information comprising at least one frame captured from a second video conference system having an active video conference session with the first video conference system;
   identifying a mobile communication device associated with the transfer indication and having the active voice communication session;
   identifying a target communication device using the image information associated with the transfer indication; and
   initiating transfer of the voice communication session to the target communication device, and
   wherein the transfer indication comprises a predetermined gesture and wherein the step of identifying a target communication device using the image information further comprises:
     determining an indicated direction of the predetermined gesture;
     identifying an image of a second user of the second video conference system based on the indicated direction;
     analyzing the image of the second user to determine an identity of the second user; and
     determining a second mobile communication device associated with the identity of the second user to be the target communication device.

8. The method of claim 7, further comprising:
   maintaining an enterprise database comprising a plurality of personnel records, each personnel record having an image, a personnel identifier, and an associated mobile communication device; and
   accessing the enterprise database to match portions of the image information with images in the enterprise database to determine the identity of the second user.

9. The method of claim 8, further comprising accessing a list of participants scheduled for an ongoing conference between the first video conference system and the second video conference system and accessing images from the personnel records for the participants.

10. The method of claim 7, further comprising interfacing with a telephony manager handling signaling for the active voice communication session to initiate transfer of the voice communication session to the target communication device.

11. The method of claim 7, further comprising requesting authorization from the mobile communication device for the transfer and, prior to initiating transfer, receiving the authorization from the mobile communication device.

12. The method of claim 7, wherein the image information comprises at least one frame captured from the first video conference system and at least one frame captured from the second video conference system.

13. An apparatus comprising:
   means for detecting a transfer indication generated by a first user of a first video conference system indicating a request to transfer an active voice communication session;
   means for acquiring image information associated with the transfer indication, the image information comprising at least one frame captured from a second video conference system having an active video conference session with the first video conference system;
   means for identifying a mobile communication device associated with the transfer indication and having the active voice communication session;
   means for identifying a target communication device using the image information associated with the transfer indication; and
   means for initiating transfer of the voice communication session to the target communication device, and
   wherein the means for identifying a target communication device using the image information further comprises:
      means for determining an indicated direction of the predetermined gesture;
      means for identifying an image of a second user of the second video conference system based on the indicated direction;
      means for analyzing the image of the second user to determine an identity of the second user; and
      means for determining a second mobile communication device associated with the identity of the second user to be the target communication device.

14. The apparatus of claim 13, further comprising:
   means for maintaining an enterprise database comprising a plurality of personnel records, each personnel record having an image, a personnel identifier, and an associated mobile communication device; and
   means for accessing the enterprise database to match portions of the image information with images in the enterprise database to determine the identity of the second user.

15. An apparatus comprising:
   a communications interface coupled to a first video conference system and a second video conference system;
   a controller capable of detecting a transfer indication generated by a first user of the first video conference system and acquiring image information associated with the transfer indication, the image information comprising at least one frame captured from the second video conference system in conjunction with an active video conference session between the first video conference system and the second video conference system, the controller further capable of identifying a mobile communication device associated with the transfer indication and having an active voice communication session, identifying a target communication device using the image information associated with the transfer indication, and initiating transfer of the voice communication session to the target communication device, and
   wherein the transfer indication comprises a predetermined gesture and wherein the controller is further capable of identifying a target communication device using the image information by determining an indicated direction of the predetermined gesture, identifying an image of a second user of the second video conference system based on the indicated direction, analyzing the image of the second user to determine an identity of the second user, and determining a second mobile communication device associated with the identity of the second user to be the target communication device.

16. The apparatus of claim 15, wherein the controller is further capable of analyzing the image of the second user to determine an identity of the second user by accessing an enterprise database to attempt to match portions of the image information with images in the enterprise database, wherein the enterprise database comprises a plurality of personnel records, each personnel record having an image, a personnel identifier, and an associated mobile communication device.

17. The apparatus of claim 16, wherein the controller is further capable of accessing a list of participants scheduled for an ongoing conference between the first video conference system and the second video conference system and accessing images from the personnel records for the participants.

18. The apparatus of claim 15, wherein the controller is further capable of requesting authorization from the mobile communication device for the transfer and, prior to initiating transfer, receiving the authorization from the mobile communication device.

* * * * *